United States Patent [19]

Briska et al.

[11] B 4,000,251
[45] Dec. 28, 1976

[54] METHOD OF PURIFYING AMMONIUM FLUORIDE SOLUTIONS

[75] Inventors: Marian Briska, Boeblingen; Wolfgang Hoffmeister, Gaertringen, both of Germany

[73] Assignee: International Business Machines Corporation, Armonk, N.Y.

[22] Filed: Nov. 7, 1974

[21] Appl. No.: 521,612

[44] Published under the second Trial Voluntary Protest Program on March 9, 1976 as document No. B 521,612.

[30] Foreign Application Priority Data

Dec. 7, 1973 Germany ..................... 2360974

[52] U.S. Cl. .............................. 423/471; 23/293 R
[51] Int. Cl.$^2$ .......................................... C01C 1/16
[58] Field of Search .......... 423/471, 470; 23/293 R

[56] References Cited

UNITED STATES PATENTS

| | | | |
|---|---|---|---|
| 2,780,522 | 2/1957 | Gloss et al. | 423/470 |
| 2,816,818 | 12/1957 | Gross | 423/470 |
| 3,201,193 | 8/1965 | Baumann | 423/471 |

*Primary Examiner*—Edward Stern
*Attorney, Agent, or Firm*—David M. Bunnell

[57] ABSTRACT

Newly precipitated $MnO(OH)_2$ is either added to an $NH_4F$ solution that has been made slightly basic or this compound is formed in the $NH_4F$ solution by adding an Mn (II) and an Mn (VII) salt solution. $MnO(OH)_2$ absorbs As and noble metal ions. The purity obtained is $10^{-8}$ per cent by weight (starting from $\leq 10^{-5}$ per cent by weight) of $NH_4F$ solution.

9 Claims, No Drawings

METHOD OF PURIFYING AMMONIUM FLUORIDE SOLUTIONS

BACKGROUND OF THE INVENTION

This invention relates generally to the purification of semiconductor etching solutions and more particularly to a method of removing metal ions from ammonium fluoride solutions.

Ammonium fluoride solutions, normally mixed with hydrofluoric acid are used in great quantities for semiconductor etching operations. Such solutions contain traces of impurities of, for example, copper, arsenic, gold, palladium, and silver which because of their positive electrode potential are irreversibly deposited on the semiconductor surfaces during the manufacturing process, causing serious electrical defects, such as inversions and gate shorts in field-effect transistors. Particularly detrimental is arsenic which as a result of its valence V leads to surface inversions, in particular in the layers that are slightly $p$ doped, and thus to frequent failures when used in conjunction with insulated gate field-effect transistors that are being employed to an ever increasing extent. Therefore, it is essential to use ammonium fluoride solutions in which the impurity traces mentioned do not exceed quantities of $\leq 2 \times 10^{-6}$ percent by weight. Certain applications require purities of even less than $10^{-7}$ percent by weight of arsenic. However, commercially available ammonium fluoride solutions contain as much as $10^{-5}$ percent by weight of arsenic. From this if follows that methods of generating ammonium fluoride solutions with the required percentage purity are of great importance. The following description is essentially related to arsenic. This element is particularly detrimental, being more difficult to remove than other impurity traces, and the methods used to remove it are at least equally suitable for the removal of other inpurity traces. In view of this, the following description applies in analogy to other impurity traces.

Generally ammonium fluoride is produced from ammonia and hydrofluoric acid, and most known processes for producing highly pure ammonium fluoride solutions are based on processes permitting the basic materials to be produced without difficulty, but it is more problematical to produce hydrofluoric acid with an arsenic content of less than $2 \times 10^{-6}$ percent by weight when the fluorspar ($CaF_2$) from which the hydrofluoric acid is formed contains great quantities of arsenic. There are, it is true, fluorspar deposits whose arsenic content is so low that the hydrofluoric acid formed from them meets the purity standards without additional purification steps. But fluorspar of such purity is not always available. German Pat. No. 1,290,529 describes a method of removing arsenic impurities from hydrofluoric acid, whereby the impurities are separated by distilling the hydrofluoric acid, which in the case of arsenic necessitates that the arsenic be initially converted into a high-boiling valence V compound by adding oxidizing agents, such as potassium permanganate or iodine. A similar method is described in German Patent No. 1,767,548. As is shown in the drawing accompanying Pat. No. 1,767,548, a highly complicated apparatus is necessary for executing the above-mentioned purification method. In addition, there are material and safety problems which occur in particular when working with hot hydrofluoric acid. Another method of purifying hydrofluoric acid which requires a less elaborate apparatus is described in German Pat. No. 1,221,614. The method in accordance with Pat. No. 1,221,614 utilizes the property of arsenic of irreversibly depositing itself on semiconductor surfaces. During the distillation process of hydrofluoric acid, the acid vapor is passed through a column packed with a higher pure semiconductor material. Such packings are, of course, very expensive, so that the latter method is used only for special studies on a laboratory scale requiring small quantities of highly pure hydrofluoric acid. Apart from the difficulties described, these known methods have the disadvantage of being applicable only to hydrofluoric acid alone but not to ammonium fluoride solutions which cannot be distilled because of their high salt content. Therefore, previously known methods are unsuitable for removing impurities from ammonium fluoride solutions which, for example, have entered the solutions as a result of prolonged storage and for which subsequent purification steps are necessary if the analyzed arsenic content is too high or where used ammonium fluoride solutions have to be regenerated.

Therefore, it is the object of the invention to provide a method permitting impurity traces to be rapidly and reproducibly removed directly from ammonium fluoride solutions down to a residual content of less then $2 \times 10^{-6}$ percent by weight or, if possible, down to a value which is 1 to 2 orders lower than the latter value. It is a further object that this method must be suitable for use under manufacturing conditions, taking into account the special safety risk involved, and that the equipment required is not too elaborate.

SUMMARY OF THE INVENTION

To this end the invention is characterized in that manganese oxide hydrate ($MnO(OH)_2$) is suspended in the ammonium fluoride solution ($NH_4F$), and then filtered off after a certain period of time.

The impurity traces are retained in the manganese oxide hydrate mainly by adsorption, although the ammonium fluoride content is high. The method is uncomplicated and requires very little equipment even when used on a larger scale. This makes the method economical. In addition, the method is very simple, and since the ammonium fluoride solution does not have to be heated, the safety risk involved is very low. The method can be applied directly to ammonium fluoride solutions and thus is suitable for repurifying previously purified ammonium fluoride solutions that have deteriorated during storage. The method is also suitable for purifying low-quality ammonium fluoride solutions and for regenerating used ammonium fluoride solutions and used, buffered hydrofluoric acid. The method by being applied only once ensures purities of $10^{-8}$ percent by weight of arsenic, whereby the amount of arsenic present in the solution is insignificant. The purity obtained is 1 ½ to 2 orders higher than that generally required to meet present semiconductor technology standards, so that the method can also be used to produce buffered hydrofluoric acid, i.e., a mixture of hydrofluoric acid and a multiple excess of ammonium fluoride solutions with an arsenic content that is below the permissible tolerance limit. To this end, an ammonium fluoride solution purified by means of the inventive method is mixed with hydrofluoric acid whose arsenic content exceeds the permissible tolerance limit. Although during application of the method very small quantities of manganese may enter the ammonium fluoride solution, the solubility product of the manganese oxide hydrate is extremely low under the existing conditions, and the electrode potential of the manganese is more negative than that of the semiconductor materials, so that during the etching of semiconductor materials there is no risk of manganese being deposited on the semiconductor surface. It is pointed out that the method in accordance with the invention is also suitable for extracting arsenic from ammonium fluoride solutions for the purpose of analysis.

DETAILED DESCRIPTION

The manganese oxide hydrate is advantageously produced by volumes of an aqueous manganese (II), where II designates a valence of +2, salt solution and an aqueous manganese (VII), where VII designates a valence of +7, salt solution being mixed with each other at a molar ratio of 3:2 in a slightly basic medium. It is very important that neither the manganese (II) salt nor the manganese (VII) salt is added in excess, i.e., at a molar ratio other than 3:2, since any such excess would block the active centers of the manganese oxide hydrate necessary for adsorbing the impurity traces.

It is preferred that the precipitated manganese oxide hydrate be either filtered off and subsequently stirred into the ammonium fluoride solution that has been made basic by means of an aqueous ammonium hydroxide solution or the two salt solutions be stirred into the basic ammonium fluoride solution. If the manganese oxide hydrate is directly generated in the ammonium fluoride solution, the equipment required is less elaborate, an additional filtering process being eliminated, and the manganese oxide hydrate generated is particularly adsorptive to impurity traces.

Starting from a commercially available 40 percent ammonium fluoride solution, it is advantageous for 1.5 to 10 grams of manganese oxide hydrate to be added to or generated in 1 liter of the solution. If a smaller quantity is added, the active centers, particularly in the case of manganese oxide hydrate precipitated outside the ammonium fluoride solution, will not be sufficient to reliably reduce the arsenic content to a value below $10^{-7}$ percent by weight. In most instances, quantities of 4 grams yield purities that meet present requirements, apart from the fact that it is difficult to analytically determine any quantities or arsenic still present after purification. As the number of active centers in the manganese oxide hydrate varies, it is advantageous for applications requiring extreme purities to add up to 10 grams of manganese oxide hydrate to each liter of the ammonium fluoride solution. Larger quantities of manganese oxide hydrate, although not being detrimental, have the disadvantage of prolonging the filtering off process of the precipitate.

For ammonium fluoride solutions with arsenic contents that are substantially above $10^{-5}$ percent by weight, or where purification is to be effected with as small an addition of manganese oxide hydrate as possible, it is advisable for the same ammonium fluoride solution to be repeatedly treated with manganese oxide hydrate. The purification effect obtained by adding several smaller quantities of manganese oxide hydrate is superior to that obtained by adding one large quantity equal to the sum of the small quantities.

It is preferred to use commercial manganese sulphate ($MnSO_4$) or manganese hydrofluoride ($MnF_2 \cdot HF$) as the manganese II salt. $MnF_2 \cdot HF$ offers the advantage in that where it is used, no additional anion is added to the solution. However, in the case of a highly improbable impairment resulting from sulphation, this would matter only if the manganese were to be generated in the ammonium fluoride solution.

As the manganese (VII) salt, either potassium permanganate ($KMnO_4$) or ammonium permanganate (($NH_4$)$MnO_4$) can be used, the latter being particularly recommendable to avoid, in the case of insulated gate field-effect transistors, for example, additions of alkali metal ions.

An important characteristic of the manganese oxide hydrate used in connection with the method described is its surface activity. Manganese oxide hydrate having a good surface activity can be obtained, for example, by neutral or slightly basic solutions of a manganese (II) salt, such as manganese sulphate, and of a manganese (VII) salt, such as potassium or ammonium permanganate, being mixed with each other, whereby the following reaction occurs:

$$4MnO_4^- + 6Mn^{2+} + 20(OH)^- \rightleftarrows 10MnO(OH)_2 + 3O_2$$

This reaction proceeds quantitatively, so that it is easy to calculate the quantities of manganese (II) and manganese (VII) salt required for precipitating a predetermined quantity of manganese oxide hydrate. A precrequisite prerequisite this is that neither the manganese (II) nor the manganese (VII) salt is used in excess. To this end it is necessary, as can be seen from the reaction equation, that the manganese (II) and the manganese (VII) salt are always mixed at a molar ratio of 3:2. Any excess quantity of the manganese oxide hydrate, will render the manganese oxide hydrate partially ineffective. The molar ratio of 3:2 not only applies to the balance of the total reaction but the two salts should be added at said molar ratio during the reaction, so that $Mn^{2+}$ or $MnO_4^-$ ion inclusions in the precipitated manganese oxide hydrate are definitely avoided. To facilitate a correct dosage, it is advisable to prepare solutions of the two salts which contain in identical volumes of solutions equivalent quantities of salt.

The manganese oxide hydrate is generated either directly in the ammonium flouride solution that has been made slightly basic or separately in a slightly ammoniacal medium to be subsequently added to the slightly basic ammonium fluoride solution. The manganese oxide hydrate or the two salt solutions can be added to the ammonium fluoride solution either all at once, continuously, or in small quantities. It may also be advisable to introduce a filtering step after one or several portions have been added, before adding the next portion. This is particularly recommendable for ammonium fluoride solutions whose arsenic content is essentially in excess of $10^{-5}$ percent by weight. Generally, where the manganese oxide hydrate is added in several small quantities, the total quantity required is smaller than where the manganese oxide hydrate is added all at once.

The ions — $Mn^{4+}$, $NH_4^+$, $K^+$ and $SO_4^{2-}$ — which are introduced into the ammonium fluoride solution by the two salt solutions are generally uncritical. But where the purified ammonium fluoride solution is used to etch FET components it is advisable, however, to use ammonium permanganate instead of potassium permanganate.

The use of the method is not limited to ammonium fluoride solutions. Ammonium fluoride buffered hydrofluoric acid, such as a mixture consisting of 1 part of hydrofluoric acid and 10 parts of an ammonium fluoride solution, which is used for silicon dioxide etching in semiconductor technology, can also be purified by the inventive method. Used buffered hydrofluoric acid, for example, can be regenerated by making it slightly basic by the addition of ammonia, treating it with manganese oxide hydrate, and finally adjusting it with the aid of fresh hydrofluoric acid. To this end the fresh hydrofluoric acid used may have an arsenic content exceeding $2 \times 10^{-6}$ percent by weight (see example 5).

The following description of five embodiments shows in detail how the inventive method is applied and how effective it is.

EXAMPLES 1 – 4

The table shows the type and quantities of the chemicals used and the arsenic content of the ammonium fluoride solution before and after purification.

To determine the purification effect, the quantity of arsenic precipitated by the mangenese oxide hydrate was radiochemically determined.

For example 1, the quantities of manganese sulphate and ammonium permanganate in aqueous solution required for precipitating the predetermined quantities of manganese hydrate oxide were mixed with each other, while being agitated, in a slightly ammoniacal medium. Subsequently, the precipitate formed was filtered off and added in a moist state to the magnetically agitated ammonium fluoride solution to be purified. To this end the latter solution which had previously been made basic by the addition of aqueous ammonium hydroxide, was contained in a polyethylene beaker. After the precipitate had been added in full, 10 minutes were allowed to elapse, and finally the manganese oxide hydrate was separated by centrifuge.

In the case of the examples 2–4 the ammonium fluoride solution to be purified and contained in a polyethylene beaker was agitated by means of a magnetic stirrer, made basic by an aqueous ammonium solution, and subsequently the aqueous manganese sulphate and the ammonium permanganate solutions were added. After the salt solutions had been added in full, agitation was stopped, 10 minutes were allowed to elapse, and the manganese oxide hydrate precipitate formed was separated by cnetrifuge.

The examples show that the purification effect produced by the method is excellent. As previously mentioned, the method is not limited to arsenic but is equally suitable for the removal of other impurity traces. The slightly improved purification effect that is obtained when the salt solutions are directly added to the ammonium fluoride solution is partly attributable to the fact that aging coupled with deactivation is avoided.

containing at least 1 part of 40 percent hydrofluoric acid per 10 parts of a 40 percent ammonium fluoride solution, the purified ammonium fluoride solution obtained in example 4 and having a volume of 1180 cm³ was mixed with 160 cm³ of commercial hydrofluoric acid with an arsenic content of about $10^{-5}$ percent by weight. Of the added quantity of hydrofluoric acid about 60 cm³ were to neutralize any ammonium hydroxide still present. It was found that the mixture yielded buffered hydrofluoric acid with an arsenic content of $1.5 \times 10^{-6}$ percent by weight, i.e., the buffered hydrofluoric acid had the percentage purity required.

While this invention has been particularly described with reference to the preferred embodiments thereof, it will be understood by those skilled in the art that the foregoing and other changes in form and details may be made therein without departing from the spirit and scope of the invention.

What is claimed is:

1. Method of removing metal ion impurity traces, including arsenic and the noble metals, from an ammonium fluoride solution, comprising suspending manganese oxide hydrate, $MnO(OH)_2$, in the ammonium fluoride solution, such that said manganese oxide hydrate absorbs said impurity traces so that said impurity traces remaining in said solution are less than $2 \times 10^{-6}$ percent by weight, and then removing said manganese oxide hydrate.

2. Method in accordance with claim 1, in which the manganese oxide hydrate, is formed by mixing volumes of an aqueous manganese (II) salt solution and an aqueous manganese (VII) salt solution in a slightly basic medium in a molar ratio of 3 : 2.

3. Method in accordance with claim 2 in which after the manganese oxide hydrate has been precipitated, the precipitate is filtered off and stirred into an ammonium fluoride solution that has previously been made basic by means of an aqueous ammonium hydroxide solution.

4. Method in accordance with claim 2, in which the two salt solutions are stirred into the ammonium fluoride solution that has previously been made basic by means of an aqueous ammonium hydroxide solution.

5. Method in accordance with claim 1 in which between 1.5 and 10 grams of manganese oxide hydrate are added to or generated in each liter of a 40 percent ammonium fluoride solution.

6. Method in accordance with claim 1 in which the treatment of the same ammonium fluoride solution with manganese oxide hydrate is repeated.

7. Method in accordance with claim 1 in which manganese sulphate ($MnSO_4$) or manganese hydrofluoride ($MnF_2.HF$) is used as the manganese (II) salt.

8. Method in accordance with claim 1 in which potassium permanganate ($KMnO_4$) is used as the manganese Addition to 1 liter of 40 per cent $NH_4F$ solution with an arsenic content of about $10^{-5}$ per cent by weight.

| Example No. | $MnO(OH)_2$ in grams | 25 per cent $NH_4OH$ solution in ccm | 0.5 n Mn(II) salt solution in ccm | 0.5 n Mn(VII) salt solution in ccm | Arsenic Content in per cent by weight after purification |
|---|---|---|---|---|---|
| 1 | 2 | 80 | | | $4 \times 10^{-8}$ |
| 2 | | 80 | 10 | 10 | $2 \times 10^{-7}$ |
| 3 | | 80 | 25 | 25 | $\sim 1 \times 10^{-7}$ |
| 4 | | 80 | 50 | 50 | $\sim 10^{-8}$ |

EXAMPLE 5

For producing a buffered hydrofluoric acid with an arsenic content of $2 \times 10^{-6}$ percent by weight and (VII) salt.

9. The method of claim 1 wherein said manganese oxide hydrate is removed by centrifuging.

* * * * *